United States Patent
Gott

[11] 3,714,477
[45] Jan. 30, 1973

[54] COMBINATION FLUX SHIELD AND FLUX SHUNT FOR A DYNAMOELECTRIC MACHINE

[75] Inventor: Brian E. B. Gott, Delanson, N.Y.

[73] Assignee: General Electric Company

[22] Filed: Aug. 23, 1971

[21] Appl. No.: 173,749

[52] U.S. Cl. ................................................. 310/256
[51] Int. Cl. ............................................... H02k 1/12
[58] Field of Search.............310/254, 256, 270, 271

[56] References Cited

UNITED STATES PATENTS

| | | | |
|---|---|---|---|
| 3,100,271 | 8/1963 | Darrieus et al. | 310/256 |
| 1,645,070 | 11/1927 | Pohl | 310/256 |
| 1,816,795 | 7/1931 | Pohl | 310/256 |
| 2,795,714 | 6/1957 | Baudry | 310/256 |
| 1,689,187 | 10/1928 | Pohl | 310/256 |
| 3,435,262 | 3/1969 | Bennett et al. | 310/54 |

FOREIGN PATENTS OR APPLICATIONS

| | | | |
|---|---|---|---|
| 220,362 | 8/1924 | Great Britain | 310/256 |

Primary Examiner—J. D. Miller
Assistant Examiner—Mark O. Budd
Attorney—William C. Crutcher

[57] ABSTRACT

A combination flux shield and flux shunt for the end of a laminated dynamoelectric machine stator core to redirect and to control the stray end region flux so as to minimize the effects of axial flux penetration into the stator core. A low permeability, electrically conductive flux shield deflects flux from the generator core "yoke" portion into the "tooth" portion and a high permeability flux shunt with stepped laminations in the tooth portion collects flux and diverts it into a radial path parallel to the main synchronous flux.

2 Claims, 2 Drawing Figures

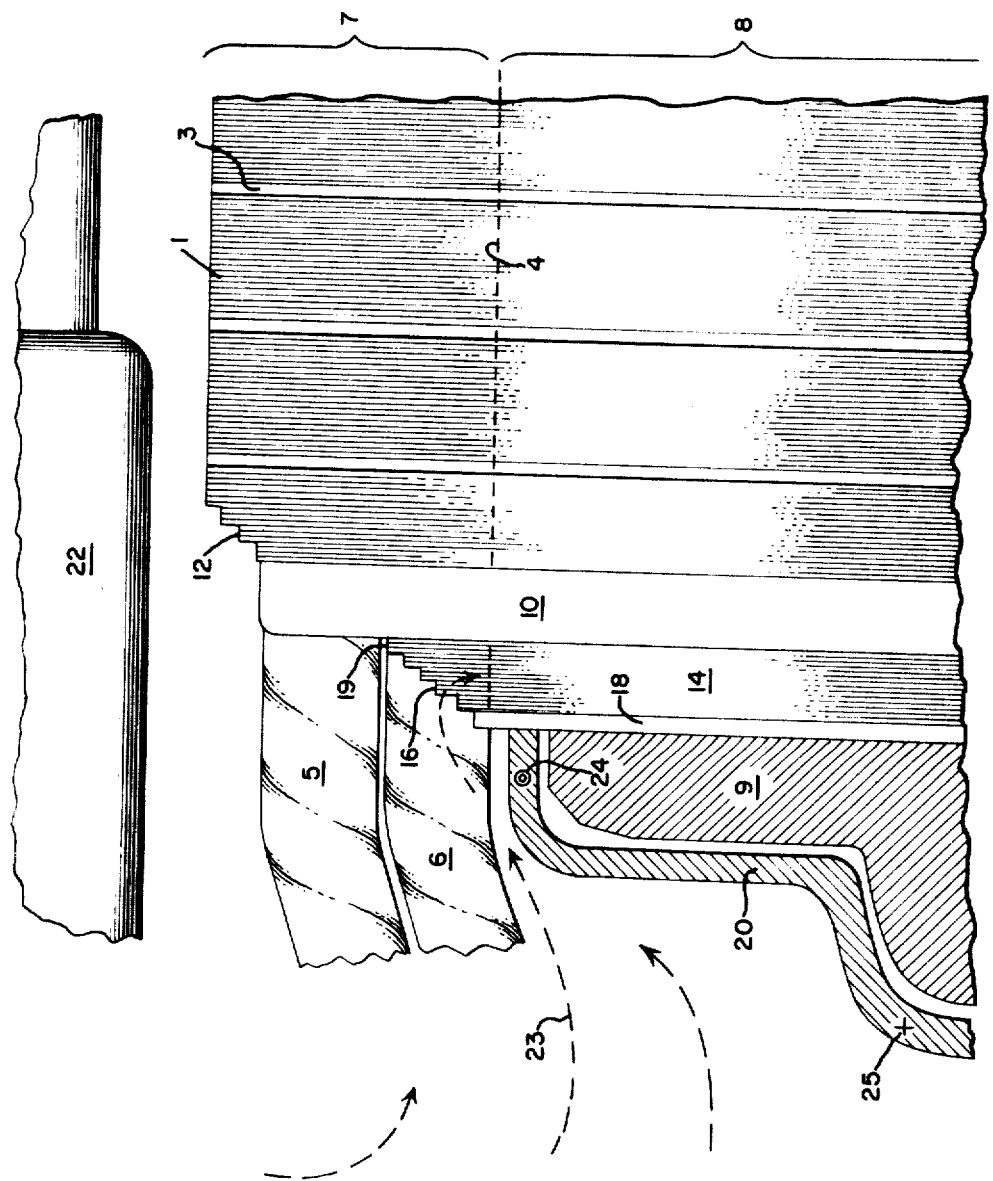

COMBINATION FLUX SHIELD AND FLUX SHUNT FOR A DYNAMOELECTRIC MACHINE

BACKGROUND OF THE INVENTION

The present invention relates to large dynamoelectric machines having laminated stator cores, and more particularly relates to an improved construction to control the stray flux in the end turn region of the machine so as to minimize the effects of axial flux penetration into the stator core.

In a large dynamoelectric machine such as a turbine-generator, the main synchronous flux produced by the rotating field winding follows paths in high magnetic permeability laminations disposed transverse to the rotor axis so as to link with the main winding disposed in slots in the stator core. In the end turn region, where the armature bars emerge from the stator core and follow a complex configuration, stray flux both from the rotor field winding and from the currents flowing in the armature bars follows undesired patterns and has axial components tending to penetrate both the "yoke" portion and "toothed" portion of the stator core causing undesirable heating and other losses.

Constructions have long been known which step back the main stator core laminations at the end of the core to minimize overheating by establishing a better path for the flux in a radial direction. R. Pohl in U. S. Pat. No. 1,689,187 has suggested additional stepped-back laminations outside of the main core laminations in the tooth region of the core, and R. A. Baudry in U. S. Pat. No. 2,795,714 has suggested similar stepped-back laminations outside of the main windings in the yoke portion of the core. The foregoing types of construction are known herein as a "flux shunt" because they are of material having a high magnetic permeability and the stepped laminations tend to collect and redivert magnetic flux parallel to the main synchronous flux in a plane transverse to the rotor axis.

Constructions have also been known in the prior art and in use by the applicant's assignee which employ a "flux shield." This is typically a copper annulus shaped to conform to the contour of the iron clamping flange holding the laminations in place. The shield is a conductive member of low magnetic permeability and arranged to produce circulating currents therein which form a shielding magnetic field diverting the stray flux away from the stator core.

Since the foregoing devices operate on different principles, they heretofore have been used to the mutual exclusion of one another. However, with larger ratings of dynamoelectric machines, it is essential to control the end region fluxes in a manner so as to minimize the detrimental effect on the dynamoelectric machine.

Accordingly, one object of the present invention is to provide an improved construction for the end of a dynamoelectric machine stator core to minimize the effects of stray leakage flux in the end turn region.

Another object of the invention is to provide an improved construction which effectively combines a flux shield and flux shunt so as to minimize axial flux penetration into the stator core.

SUMMARY OF THE INVENTION

Briefly stated, the invention is practiced by providing a conductive, low permeability flux shield arranged to protect the yoke portion of the stator core and a high permeability flux shunt comprising stepped-back laminations in the tooth region arranged to collect flux diverted by the flux shield.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing, in which:

FIG. 1 is a perspective view of a portion of the dynamoelectric machine stator core at the end thereof, and FIG. 2 is a cross-sectional view of the same portion of the dynamoelectric machine.

DESCRIPTION OF THE PREFERRED EMBODIMENT

Figure 1:
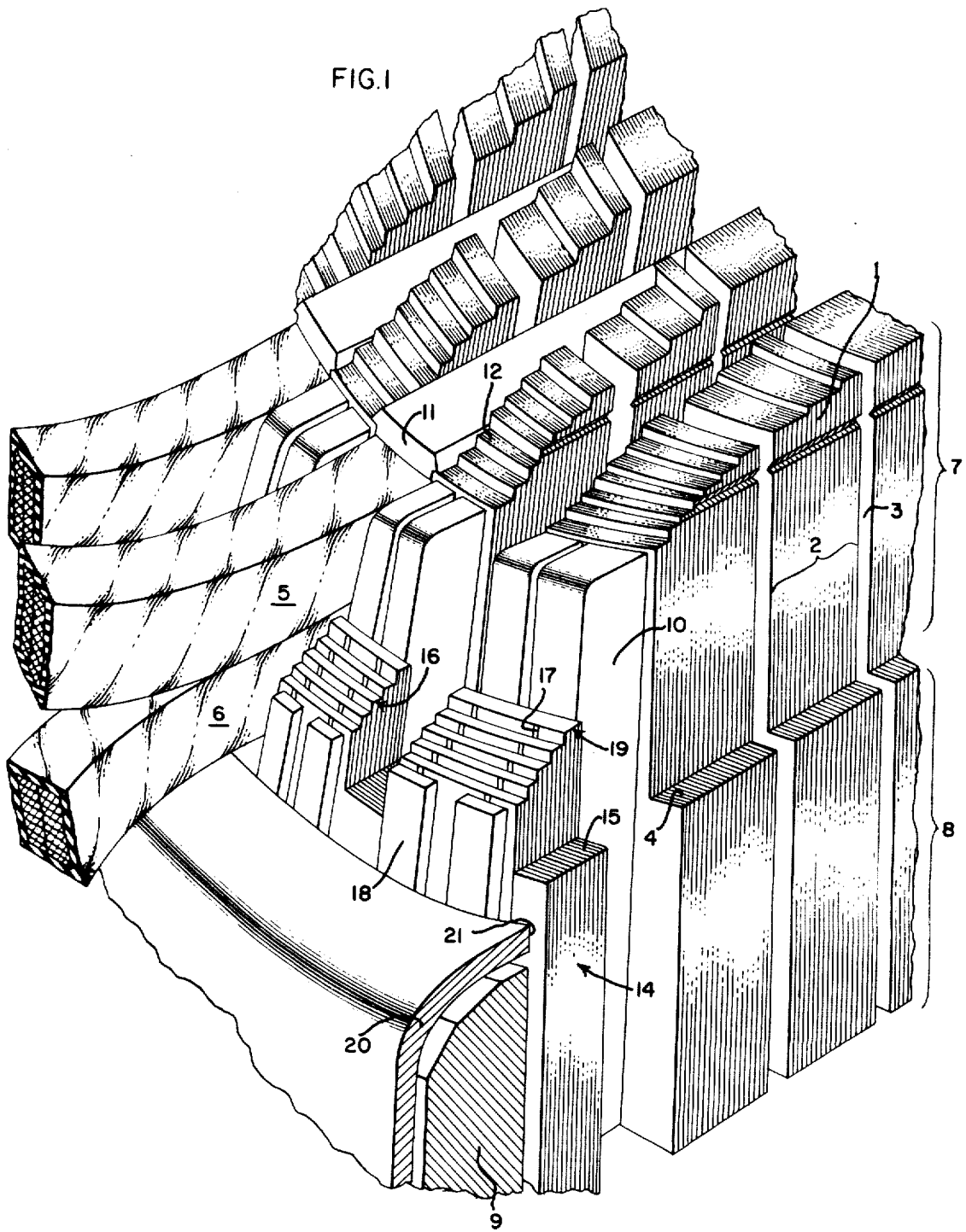

Referring now to FIG. 1 of the drawing, a perspective view is shown looking into the bore of a dynamoelectric machine core from the end. The main stator core comprises stacked laminations 1 of iron punchings arranged in packages 2 separated by gas cooling ducts 3. The punchings have aligned cutout portions 4, together forming slots in which are disposed the top and bottom main armature bars 5, 6, respectively. The stator core may generally be divided, therefore, into a "toothed" portion 7 (i.e., comprising the teeth between the slots) and a "yoke" portion 8 (i.e., the portion of the core radially outward of the main windings). The laminations are axially compressed and held in place by a steel clamping ring 9 and the force of the clamping ring is extended to the toothed portion 7 by means of outside space blocks 10 which press axially on the teeth. It remains to note that the armature bars 5, 6 are retained in place by suitable wedges 11 and that the main laminations 1 are stepped back as shown at 12. All of the aforementioned details are known in the prior art.

In accordance with the present invention, a flux shunt 14 is placed between the clamping ring 9 and the outside space blocks 10. Flux shunt 14 is made up of stacked laminations constructed in the manner of those in the main core, but of shorter length. These are provided with cutouts 15 aligned with cutouts 4 in the main laminations so as to extend the generator slot. The ends of the laminations are stepped back as indicated at 16 in the manner of those in the main core but at a greater diameter. If desired, these may be provided with additional slits 17 to decrease the eddy current losses in the parts of the flux shunt exposed to the axial component of flux. Shunt ring space blocks 18 are provided between the shunt ring and the clamping flange 9 so as to extend the pressure of the clamping ring to the extending tooth portions of the shunt ring laminations. Spaces between space blocks 18 also provide gas passages for cooling. The axially innermost package of laminations in the shunt ring indicated at 19 extends radially inward (upward in the drawing) to a location approximately between the top and bottom armature bars 5, 6. The shunt ring laminations are preferably assembled ahead of time and bonded into a ring for ease of assembly.

A flux shield is identified by reference numeral 20 and consists of an annulus of highly conductive, low permeability material contoured to follow the shape of the clamping ring 9. The shield may suitably be of copper of about one-half inch thickness. Its radially innermost edge 21 terminates adjacent the flux shunt 14 just below the slot cutout portions 15.

OPERATION

Reference to the cross section shown in FIG. 2 of the drawing will illustrate the operation of the combination flux shield and flux shunt. A portion of the generator rotor is indicated at 22. Stray flux passing through the rotor and retaining ring enters longitudinally from the end turn region as indicated by dotted arrows 23. Circulating currents are induced in the flux shield 20 which have a circumferential component in one direction at the radially inner portion of the flux shield and in the opposite circumferential direction in the outer portion of the flux shield as indicated by the ends of vectors 24, 25, respectively. The resulting electromagnetic field caused by these circulating currents opposes the longitudinally entering stray flux 23 and diverts it around the shield toward the tooth portion of the core.

The diverted stray flux enters the high permeability path provided by the stepped-back lamination ends at 16 and flows radially and then peripherally through the flux shunt 14 thereby protecting the tooth portions of the stator core from the diverted stray flux.

It has been found that the flux shunt is most effective when the stepped-back laminations extend to a radial location terminating approximately between the top armature bar 5 and bottom bar 6. Further inward extension of the flux shunt is largely ineffective and can lead to increased heating of the flux shunt teeth, while shorter extensions reduce the effectiveness of the flux shunt in capturing the diverted stray flux.

Thus, a combination flux shield and flux shunt has been described which utilizes two previously known devices in combination to provide an improved means for minimizing the effects of axial flux penetration into the stator core. Although the termination of the radially innermost flux shunt laminations between the top and bottom stator bars is believed to be the best arrangement, slightly longer or slightly shorter extensions of the flux shunt may be employed to optimize a particular design.

While there has been described herein what is considered to be the preferred embodiment of the invention, it is intended to cover in the appended claims all such modifications as fall within the true spirit and scope of the invention.

What is claimed is:

1. In a dynamoelectric machine having a laminated stator core defining a toothed portion carrying main windings in slots between said teeth and an outer yoke portion, the combination comprising:
   a flux shunt comprising a plurality of high permeability laminations disposed at the end of the core aligned with said yoke portion and part of said toothed portion,
   a clamping flange arranged outside of said main windings and arranged to hold said flux shunt laminations and said stator core laminations in place, and
   a flux shield of low permeability conductive material disposed outside of said clamping flange and having an inner peripheral edge terminating adjacent to said flux shunt between the clamping flange and the main winding, whereby circulating currents in said flux shield divert stray end flux around the clamping flange and yoke portion into the part of said flux shunt which extends into the stator core toothed portion.

2. The combination according to claim 1, wherein said main winding comprises a top armature bar and a bottom armature bar and wherein said flux shunt comprises laminations stepped radially back from a location substantially between the top and bottom bar to a location near the terminating edge of said flux shield.

* * * * *